W. B. TRACY.
TICKET DELIVERY APPARATUS.
APPLICATION FILED DEC. 19, 1917.
1,292,925.
Patented Jan. 28, 1919.
3 SHEETS—SHEET 2.
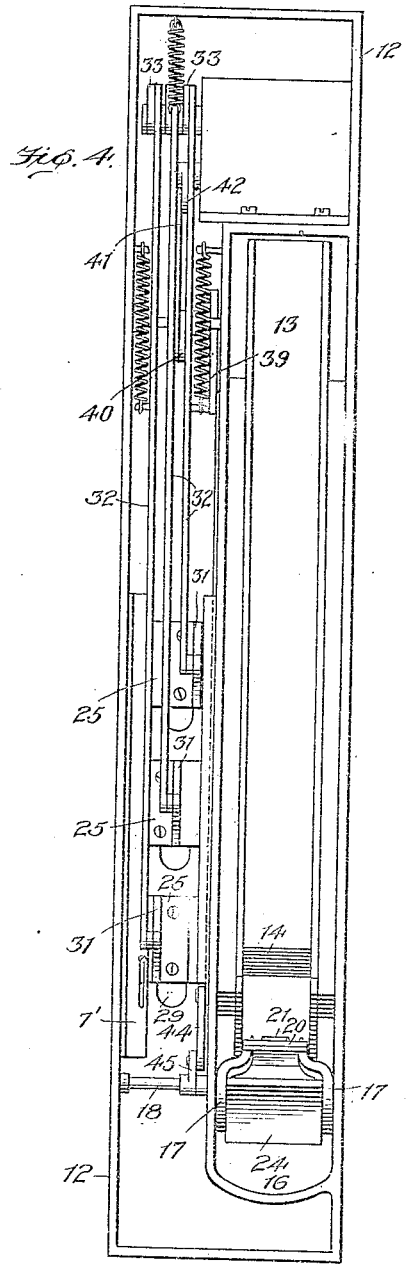
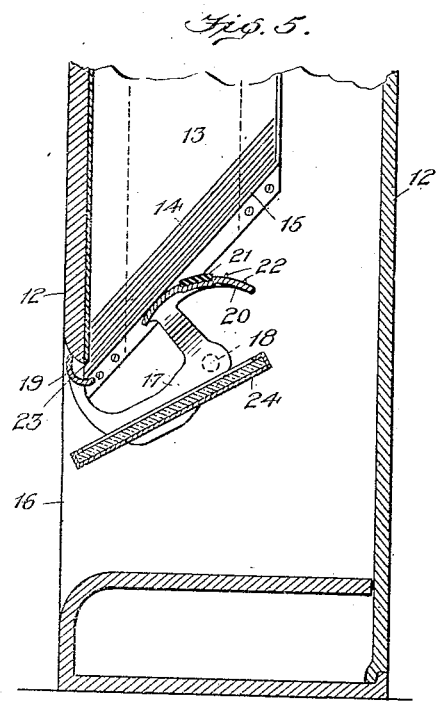
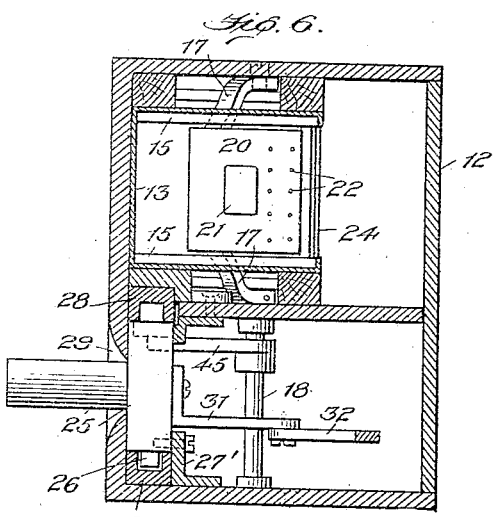
Inventor
W. B. Tracy
By
Attorney W. B. TRACY.
TICKET DELIVERY APPARATUS.
APPLICATION FILED DEC. 19, 1917.
1,292,925.
Patented Jan. 28, 1919.
3 SHEETS—SHEET 3.
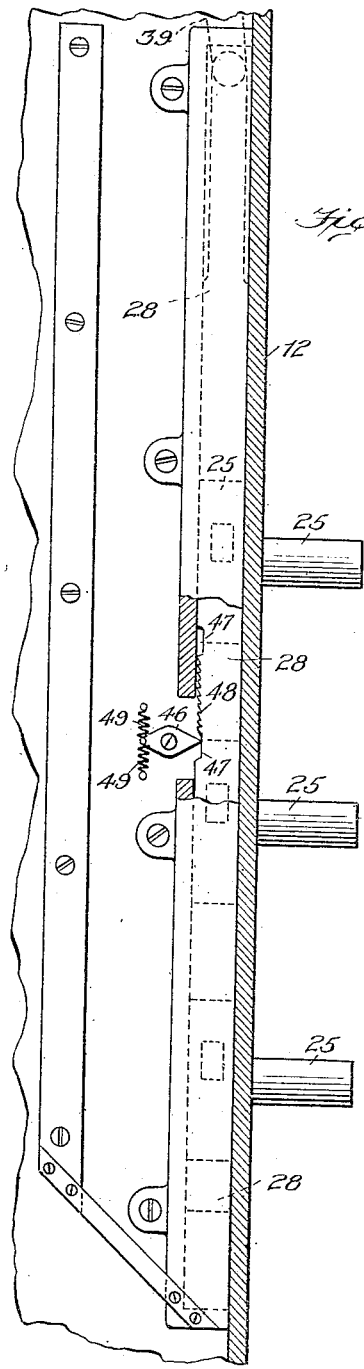
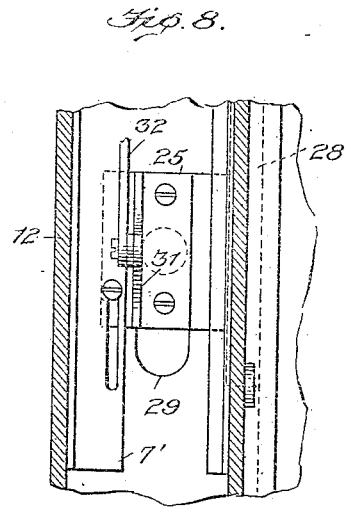
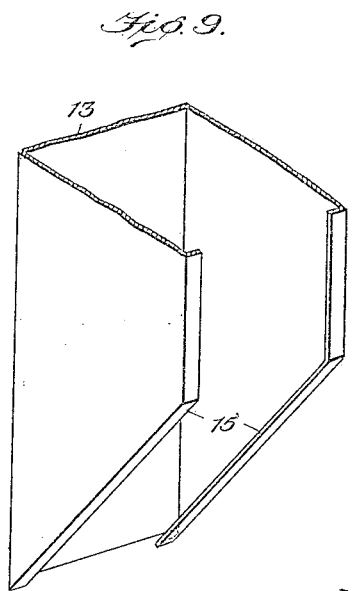

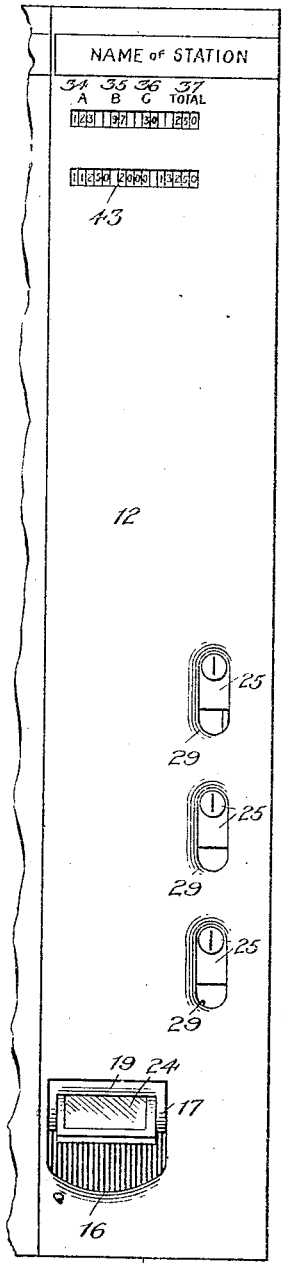
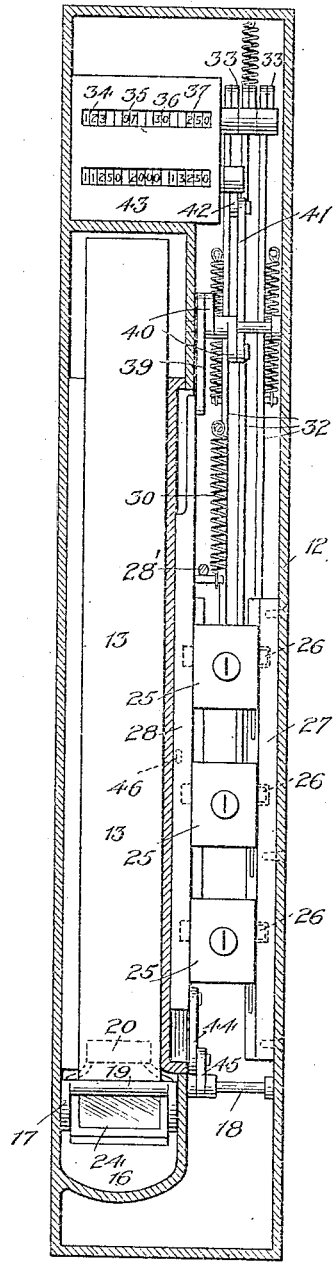
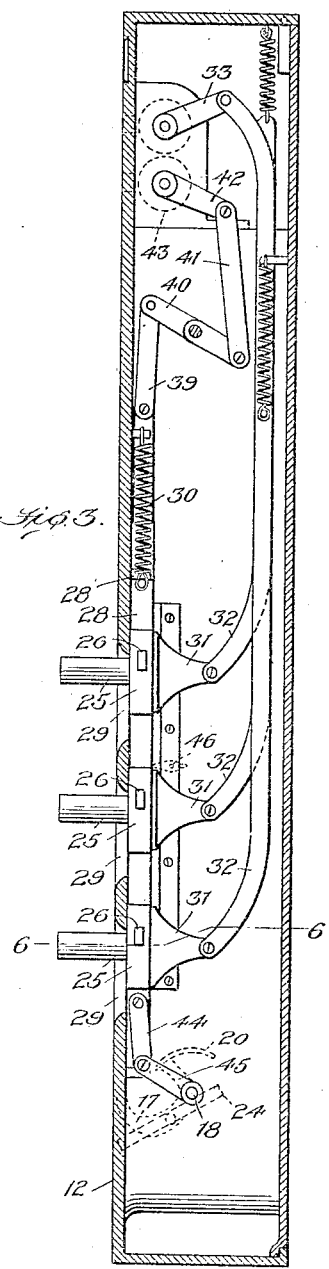

UNITED STATES PATENT OFFICE.

WALTER B. TRACY, OF MEMPHIS, TENNESSEE.

TICKET-DELIVERY APPARATUS.

1,292,925. Specification of Letters Patent. Patented Jan. 28, 1919.

Application filed December 19, 1917. Serial No. 207,889.

*To all whom it may concern:*

Be it known that I, WALTER B. TRACY, a citizen of the United States, and resident of Memphis, in the county of Shelby and State of Tennessee, have invented certain new and useful Improvements in Ticket-Delivery Apparatus, of which the following is a specification, reference being had therein to the accompanying drawing.

My invention relates to delivering railway tickets and the like, and its objects are to register the value of each ticket sold, and the total value of tickets sold by each seller, the total value of all tickets sold, regardless of individual seller, to prevent the withdrawal of tickets by unauthorized persons, or by any person who does not register the sale, to render visible, before withdrawal, the next ticket to be sold, and to do these things with a comparatively simple apparatus. In small offices, tickets are usually sold by more than one person and a large proportion of sales are local, single card tickets being used for each of the stations on the same line or same branch of the railway. The apparatus illustrated is adapted for using these simple tickets printed on separate cards, duplicate mechanisms being used for tickets for different stations.

In the drawings,

Figure 1 is a side elevation of apparatus embodying my invention.

Fig. 2 is a similar view with one side of the casing removed.

Fig. 3 is an elevation looking from the right in Figs. 1, 2, the corresponding side of the casing being removed.

Fig. 4 is a view similar to Fig. 3 but looking in the opposite direction.

Fig. 5 is a vertical section through the ticket delivery mechanism.

Fig. 6 is a section on the line 6—6, Fig. 3.

Fig. 7 is a partial elevation looking from the left in Fig. 2, parts being broken away.

Fig. 8 is an enlarged elevation showing the lower of several like locking devices, as are seen in Fig. 2, with certain of its connections.

Fig. 9 is a perspective view of the lower portion of a ticket receptacle, seen also in other figures.

In these figures, 12 represents a casing containing one of the duplicate mechanisms usually employed and within this casing is a vertical chamber 13 in which are superposed many duplicate tickets 14 resting upon marginal inclined supporting flanges 15 which leave the lower printed face of the lowermost ticket exposed, and below the tickets the casing is cut away in front as shown at 16, Fig. 5. In the space below the tickets a member 17 is arranged to rock about the axis of a shaft 18, mounted in the casing, and is provided with a flange or stop 19 normally preventing the withdrawal of a ticket, and with a curved member 20 normally resting against the lower ticket and engaging the same by means of a rubber pad 21 and short points 22. Rocking the member 17 in the proper direction swings the stop 19 out of place and forces the lower ticket out through the opening 16, the edge 23 of the casing being so close to the flanges 15 that but one ticket can pass at a time.

An inclined mirror 24 is fixed to the rocking member and so placed as to show the lowest ticket's head, which usually bears a designating number and the name of the station to which the ticket gives passage.

In a compartment alongside the chamber 13 are mounted spaced locks 25, shown here as three in number, although the number may be varied. The locks have no novelty herein claimed beyond the locking bolt 26 which the key may throw out on either side of the body of the lock. Normally all are thrown to the right in Fig. 2 and engage a fixed member 27 having a way 27' for one side of the body of the lock, which, as will be seen, is bodily movable in a vertical direction. On the opposite side of the locks is a vertical bar 28 sliding in a fixed way, provided with recesses to receive the ends of the lock bolts 26, respectively, when any one of the lock keys is inserted and properly turned. The cylindrical key-receiving portion of each lock projects out through a slot 29 and a spring 30 normally holds the bar 28 near the top of the slot and pressed against a stop 28', which limits the upward movement of the bar. A rigid arm 31 projects from the inner side of each lock and from each arm a link 32 extends upward and is pivotally connected to the operating arm 33 of the corresponding registering mechanism 34, 35, 36, each of which operates a registering mechanism 37. The upper end of the bar 28 is connected by a link 39, pivoted lever 40, and link 41, with the operating arm 42 of a registering mechanism 43. Each registering mechanism 34, 35, 36, 43 is arranged to register at each operation the value of one ticket, while the register 37 registers the number of tickets delivered, a unit being added at each operation. None of the registering mechanisms are novel *per se*, suitable forms being found on the market. The lower end of the bar 28 is connected by a link 44 with an arm 45 projecting from the shaft 18, so that depressing the bar 28 rocks the shaft 18 and delivers a single ticket.

If the locks are operable only by unlike keys, and if the keys are held by different individuals, any of the individuals may insert his key in the corresponding lock, withdraw its bolt from the member 27 (with which all are engaged when tickets are not to be withdrawn) and engage it with the movable bar 28, which is otherwise inaccessible. This done, he may press the lock downward to the lower end of the corresponding slot 29 and thereby deliver a ticket and register the amount on his individual register above, add a unit to the number of tickets registered, and add the value of the ticket to the amount indicated by the register 43.

To avoid the possibility of slightly depressing the lock, to throw the stop 19 below the lower ticket, and then withdrawing a ticket without registering, a centrally pivoted pawl 46, Fig. 7, is provided, the bar being furnished with two suitable recesses 47 and between the two with shallow indentations or serrations 48. Normally, the pawl lies in the lower recess and is held horizontal by springs 49. When the bar is depressed the pawl is swung downward and while inclined it readily slides over the serrations. But the distance from the pivotal axis to the end of the pawl is greater than the distance from that axis to the surfaces between the teeth and consequently the bar, once the downward movement is begun, cannot return to initial position until fully depressed, so that the pawl enters the upper recess 47 and registry has occurred. When in the upper recess, the pawl swings upwardly freely and the spring 30 restores the bar to initial position. Obviously, if the bar be slightly depressed and a ticket be withdrawn, for example by the use of a sharp hook, the apparatus shows the fraud and the indication thereof cannot be changed until the fraud is corrected by registration through completing the depression.

What I claim is:

1. The combination with suitable registers, of ticket delivery devices and a sliding bar for operating the same, a series of locks having distinctive keys and sliding between said bar and a fixed parallel support and adapted to be locked to either at will, and means whereby deliverying a ticket by sliding the lock while freed from said support and engaged with said bar operates said registers.

2. The combination with ticket delivery devices and a sliding bar for operating the same, of a series of locks having distinctive keys and slidable bodily between said bar and a fixed member and each adapted to be locked at will to said bar or said member as desired, a series of independent value registers operatively connected to the locks, respectively, and a number register and a total value register both actuated on each delivery of a ticket.

3. The combination with ticket delivery devices operable by a sliding bar, of a series of locks arranged to move bodily along said bar, each normally locked to a fixed member and each adapted to be unlocked therefrom by a distinctive key and operatively engaged with said bar, a corresponding series of registering mechanisms, and means whereby the operation of the delivery mechanism by any of said locks actuates the corresponding registering device.

4. The combination with ticket delivering devices, of a register for the total value of all delivered tickets, a series of like mechanisms for independently registering values of certain tickets delivered, a corresponding series of bodily movable locks operatively connected with said mechanisms, respectively, each having its distinctive key and normally locked against bodily movement and each adapted to be operatively connected, in unlocking, with the delivery devices and the total value register.

5. The combination with a casing provided with an internal chamber for superposed like tickets, and with ticket delivery devices, of a series of independent registering devices, a corresponding series of independent bodily movable locks each normally locked by its own key to a fixed member and operatively connected to the corresponding registering device, a movable member operatively connected with the ticket delivery devices, each lock being adapted to engage said movable member when unlocked from the fixed member; whereby freeing any lock and moving it properly causes the delivery of a ticket and registers the value upon the registering device corresponding to the lock used.

6. The combination with a casing provided with an internal chamber for like tickets and with ticket delivery devices, of a series of independent registering devices, and a register for totals of amounts registered by said devices, a movable member for actuating the delivery devices, a series of independent sliding locks each normally fixed and adapted to be released by its key and operatively engaged with said movable member and each operatively connected with the corresponding register of said series to actuate the latter when itself is caused to slide bodily, means whereby the movable member when moved by the lock actuates the totaling register, and a spring for restoring said member and the actuating lock to initial positions.

In testimony whereof I hereunto affix my signature.

WALTER B. TRACY.

Copies of this patent may be obtained for five cents each, by addressing the "Commissioner of Patents, Washington, D. C."